(No Model.)
J. C. & W. STRODEL.
TWINE RACK.
No. 545,549. Patented Sept. 3, 1895.
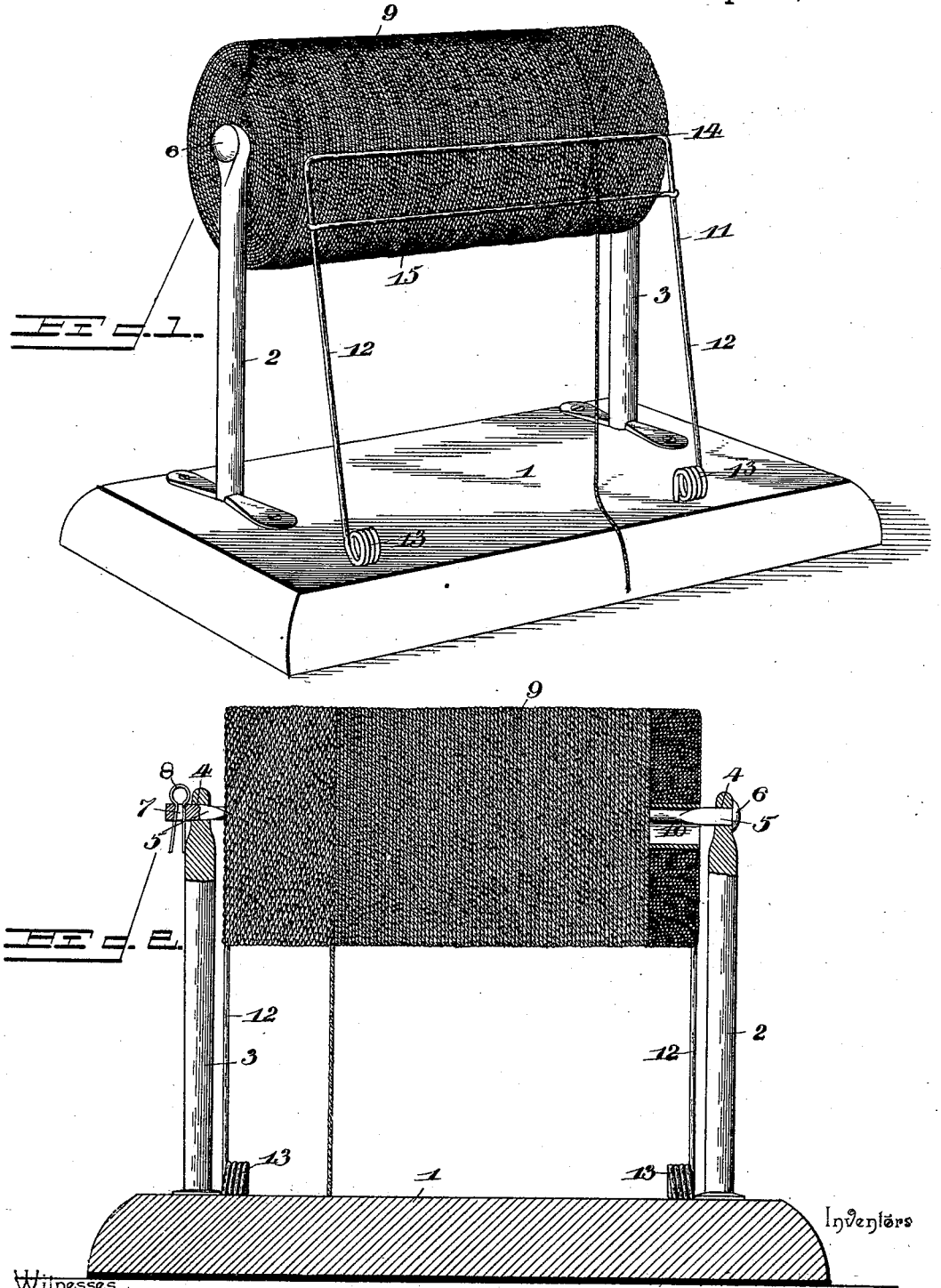

UNITED STATES PATENT OFFICE.

JOHN C. STRODEL AND WILLIAM STRODEL, OF HUNTINGTON, INDIANA.

TWINE-RACK.

SPECIFICATION forming part of Letters Patent No. 545,549, dated September 3, 1895.

Application filed April 30, 1895. Serial No. 547,687. (No model.)

*To all whom it may concern:*

Be it known that we, JOHN C. STRODEL and WILLIAM STRODEL, citizens of the United States, residing at Huntington, in the county of Huntington and State of Indiana, have invented a new and useful Twine-Rack, of which the following is a specification.

Our invention relates to a twine reel or rack, the objects in view being to provide a simple and inexpensive device adapted to hold an elongated or cylindrical spool or ball and provided with means for preventing the turning of the spool or ball, except when the cord or twine is strained, and adapted to maintain the necessary tension upon the twine until the latter is entirely exhausted from the spool.

Further objects and advantages of this invention will appear in the following description and the novel features thereof will be particularly pointed out in the appended claim.

In the drawings, Figure 1 is a perspective view of a device embodying our invention. Fig. 2 is a vertical longitudinal section of the same.

Similar numerals of reference indicate corresponding parts in both figures of the drawings.

1 designates a base from which rise standards 2 and 3, provided at their upper ends with angular—in this case square—openings 4 for the reception of the angular extremities of the spindle 5, having a rounded intermediate portion and provided at one end with a head 6 and at the other end with a slot 7 for a split key 8. This provides for the displacement of the spindle with facility to apply and remove a spool, such as that indicated at 9, the spool shown being of cylindrical construction and having a hollow core 10 for the reception of the spindle.

Mounted upon the base in position to bear against the side of the spool is a pressure or tension guide 11, having approximately-upright arms 12, provided with spring coils 13 near their lower ends and fitted at their extremities in sockets formed in the base. The upper ends of said arms are connected by parallel transverse guide-rods 14 and 15, of which the former or upper rod is preferably integral with the side arms, the loose end of the twine extending between said rods.

The tension of the spring coils holds the upper rod in contact with the surface of the spool and prevents unnecessary rotation thereof, whereby the spool turns only when the loose end of the twine is subjected to strain in the operation of unreeling, and the lower guide-rod holds the loose end of the twine in convenient position to be grasped, as will be seen by reference to Fig. 1.

From the above description it will be seen that the construction of the device is simple, that the spool is adapted to turn loosely upon the spindle, but is held from unnecessary rotation by the tension of the guide, the tension of the springs being sufficient to hold the guide in contact with the surface of the spool until all of the twine has been exhausted, whereby tangling of the twine is prevented. This is a desideratum in devices of this class in order to avoid loss of twine and insure the proper unreeling thereof toward the end as well as at the beginning of the operation of unreeling. When the spool has become exhausted, the split key may be removed and the spindle withdrawn to provide for the dismounting of the core and the mounting of a full spool without loss of time.

Various changes in the form, proportion, and the minor details of construction may be resorted to without departing from the spirit or sacrificing any of the advantages of this invention.

Having described our invention, what we claim is—

A twine reel comprising a base, standards mounted upon the base and provided at their upper ends with angular openings, a spindle having angular portions to fit in said openings in the standards, provided at one end with a head and at the other end with a slot for a split key, said spindle being adapted to support a cylindrical spool, and a pressure guide having spring-actuated side arms, the extremities of which are secured to the base, and parallel upper and lower guide rods of which the former bears against the surface of the spool to prevent excessive rotation thereof, the loose end of the twine being adapted to pass between said rods, substantially as specified.

In testimony that we claim the foregoing as our own we have hereto affixed our signatures in the presence of two witnesses.

JOHN C. STRODEL.
WILLIAM STRODEL.

Witnesses:
THOMAS L. LUCAS,
FRED ROSSWURM.